2,975,030

PREPARATION OF CYANAMIDE

William R. Rolingson, Texas City, Tex., assignor to Monsanto Chemical Company, St. Louis, Mo., a corporation of Delaware No Drawing. Filed Sept. 22, 1958, Ser. No. 762,257

5 Claims. (Cl. 23—190)

The present invention relates to a new method for the preparation of cyanamide.

It has now been found that cyanamide can be prepared by heating together hydrogen cyanide and nitric oxide in contact with an inorganic, heat-stable, highly porous adsorbent of high surface area such as activated alumina at a temperature of at least 400° C. at or slightly above atmospheric pressure. The cyanamide is formed on the surface of the adsorbent catalyst from which it may be recovered by conventional techniques such as extraction with water, for example.

The following example is given to illustrate the invention but it is not to be construed as limiting it in any manner except as it is limited in the appended claims.

Example

A quartz tube about 30 in. long and approximately 1 in. in diameter was employed as the reactor. A bed of catalyst consisting of activated alumina about 2 in. in depth was supported within the reactor on a circular porous quartz plate located at about the midpoint of the tube. The reactor was heated by means of resistance wire wrapping covered by the necessary insulation. Temperatures in the tube and catalyst bed were recorded by means of a sliding iron-constantan thermocouple inserted in a quartz thermowell which extended through the catalyst bed.

The gaseous reactants, hydrogen cyanide and nitric oxide, were fed through flowmeters at rates of approximately one mol per hr. and 0.3 mol per hr., respectively, mixed in a glass manifold, and then passed into the reactor and through the catalyst bed which was heated to a temperature of about 600° C. Pressure in the reactor was maintained at essentially atmospheric. Total reaction time was about one hour. At the end of this time, the reactor was cooled and the catalyst mass was removed, crushed, and slurried in hot water to extract the cyanamide as an aqueous solution. The mixture was filtered and the pH of the filtrate was adjusted to about 4 by the addition of nitric acid. Aqueous silver nitrate was then added to the filtrate to precipitate any cyanides present. A small amount of a white precipitate was obtained. This mixture was then filtered and the pH of the filtrate was adjusted to 8.0 by the dropwise addition of ammonium hydroxide. This resulted in the precipitation of silver cyanamide, a bright yellow solid. The mixture was filtered, the precipitate was washed with distilled water containing a few drops of ammonium hydroxide, and dried. The recovered silver cyanamide was subjected to infra-red analysis and positively identified as this compound by comparison of its infrared spectra with that of a known sample of silver cyanamide.

Conditions may be varied considerably from those given in the example without departing from the scope of the invention. Temperatures may vary, for example, from 400° C. to about 1000° C. or higher. Preferably, the reaction is conducted at temperatures within the range from about 500° to about 750° C.

Although alumina is the preferred catalyst, any inorganic substance that provides a high surface area may be used as the catalyst. Among such inorganic materials are, for example, fuller's earth, silica gel, kaolin, kieselguhr, celite, pumice, and the like.

Equimolar quantities of hydrogen cyanide and nitric oxide may be used but it is preferred to employ an excess of hydrogen cyanide. Generally, ratios of hydrogen cyanide to nitric oxide of 1:1 to 20:1 are used with ratios of 3:1 to 10:1 being preferred.

The reaction may be conducted at atmospheric pressure or at superatmospheric pressures, with pressures up to as high as 1000 p.s.i. being suitable.

Either a batch or continuous process is feasible. Other conditions being equal the yield of cyanamide varies with the reaction time in a fixed bed catalyst and is proportional to the weight of the catalyst. As the cyanamide forms and deposits on the catalyst, the catalyst decreases in activity. The most practical type of operation from a commercial standpoint, therefore, appears to be a moving-bed type of catalyst or the use of a so-called fluidized catalyst technique. The product cyanamide may be readily recovered from the surface of the catalyst by leaching with water as described or by other means well known to those skilled in the art.

What is claimed is:

1. The process of preparing cyanamide which comprises heating together hydrogen cyanide and nitric oxide at elevated temperatures in contact with an inorganic material of high surface area chosen from the group consisting of alumina, silica gel, fuller's earth, kieselguhr, kaolin, celite and pumice.

2. The process of preparing cyanamide which comprises heating together hydrogen cyanide and nitric oxide in contact with an inorganic material of high surface area chosen from the group consisting of alumina, silica gel, fuller's earth, kieselguhr, kaolin, celite and pumice at a temperature in the range from about 400° C. to about 1000° C.

3. The process of preparing cyanamide which comprises heating together hydrogen cyanide and nitric oxide in contact with an inorganic material of high surface area chosen from the group consisting of alumina, silica gel, fuller's earth, kieselguhr, kaolin, celite and pumice at a temperature in the range from about 550° C. to about 750° C.

4. The process of preparing cyanamide which comprises heating together hydrogen cyanide and nitric oxide in contact with activated alumina at a temperature within the range from about 550° C. to about 750° C.

5. The process of preparing cyanamide which comprises heating together hydrogen cyanide and nitric oxide in a mole ratio in the range from about 3:1 to about 10:1 in the presence of activated alumina at a temperature of approximately 600° C. and recovering the thus-formed cyanamide.

References Cited in the file of this patent

UNITED STATES PATENTS 2,835,556    Boatright et al. _____ May 20, 1958